United States Patent
Click, Jr. et al.

(10) Patent No.: US 6,286,134 B1
(45) Date of Patent: *Sep. 4, 2001

(54) INSTRUCTION SELECTION IN A MULTI-PLATFORM ENVIRONMENT

(75) Inventors: Clifford N. Click, Jr.; Christopher A. Vick, both of San Jose; Michael H. Paleczny, Sunnyvale, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/298,251

(22) Filed: Apr. 23, 1999

(51) Int. Cl.[7] ........................................... G06F 9/45
(52) U.S. Cl. ............................................ 717/5; 717/7
(58) Field of Search .................. 717/5, 7, 9, 10

(56) References Cited

U.S. PATENT DOCUMENTS

| | | | |
|---|---|---|---|
| 5,355,491 | * | 10/1994 | Lawlor et al. ........................ 717/7 |
| 5,432,937 | * | 7/1995 | Tevanian et al. ..................... 717/11 |
| 5,590,331 | * | 12/1996 | Lewis et al. .......................... 717/8 |
| 5,604,905 | * | 2/1997 | Tevanian et al. ...................... 717/6 |
| 5,768,593 | * | 6/1998 | Walters et al. ........................ 717/5 |
| 5,812,854 | * | 9/1998 | Steinmetz et al. .................... 717/9 |
| 5,835,773 | * | 11/1998 | Dunn .................................... 717/5 |
| 5,920,721 | * | 7/1999 | Hunter et al. ......................... 717/5 |
| 6,021,275 | * | 2/2000 | Horwat ................................. 717/7 |

OTHER PUBLICATIONS

Wazlowski et al., "PRISM–II Compiler and Architecture," Proceedings, IEEE Workshop on FPGAs for Custom Computing Machines, Apr. 5–7, 1993, pp. 9–16.*

Hatcher et al., "Efficient Retargetable Compiler Code Generation," Proceedings, International Conference on Computer Languages, Oct. 9–13, 1998, pp. 25–30.*

Aho et al., "Compilers Principles, Techniques, and Tools," Chapter 11 Want to Write a Compiler?, Mar., 1988, ISBN 0–201–10088–6, pp. 723–732.*

* cited by examiner

Primary Examiner—Tuan Q. Dam
(74) Attorney, Agent, or Firm—Beyer Weaver & Thomas LLP

(57) ABSTRACT

Systems and methods for building a platform specific compiler having an embedded instruction selector in a multi-platform environment are provided. A set of user defined platform dependent compiler architecture descriptors that describe corresponding architectural features and a set of instruction predicates defining those instructions to be selected are converted to platform dependent compiler object code and instruction selector object code, respectively. The platform specific compiler having the embedded instruction selector is formed from the platform dependent compiler object code, the instruction selector object code, and the platform independent compiler object code.

16 Claims, 12 Drawing Sheets

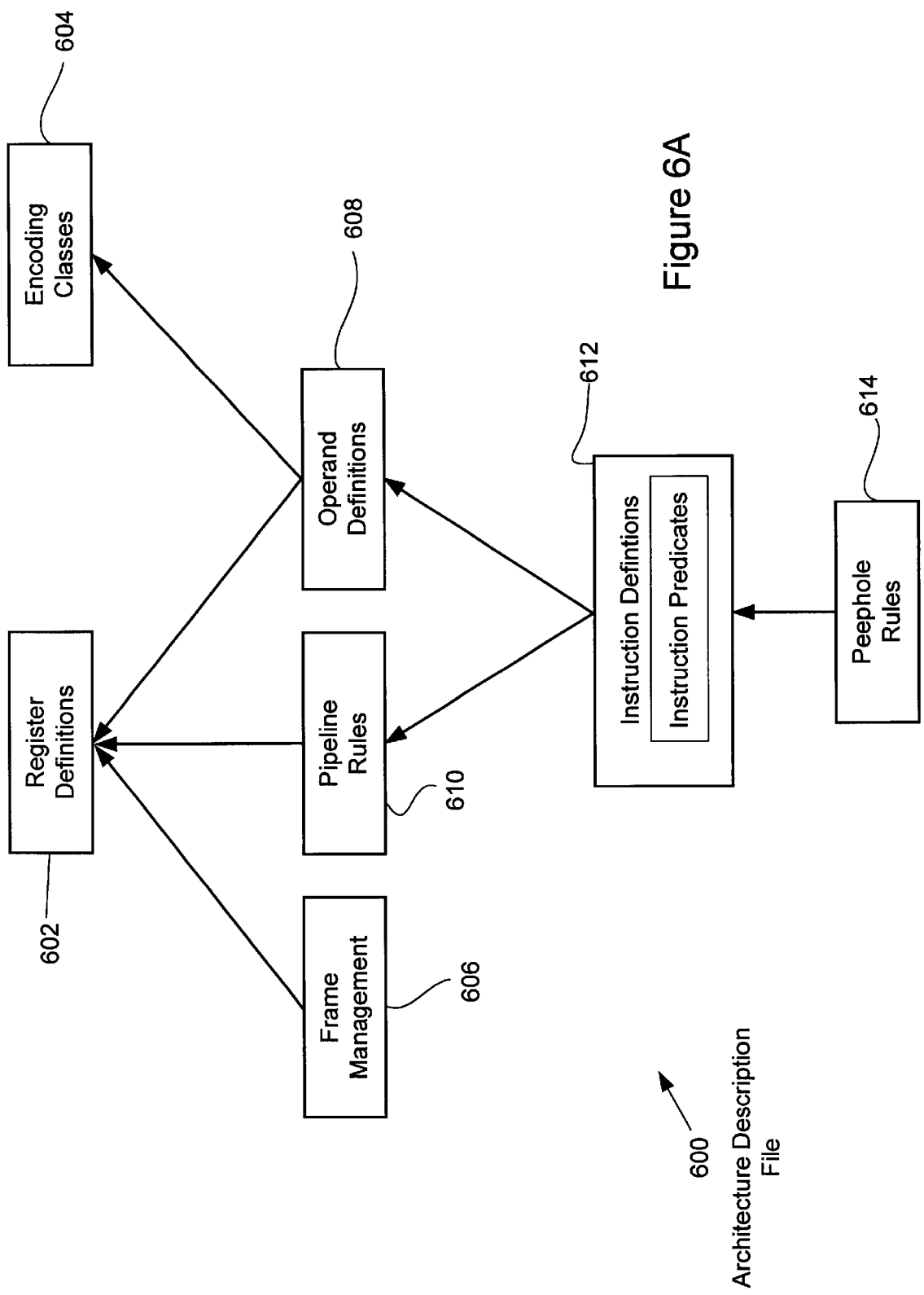

INSTRUCTION SELECTION IN A MULTI-PLATFORM ENVIRONMENT

CROSS REFERENCE TO RELATED APPLICATION

This application is related to Provisional Application No. 60/130,671 filed Apr. 23, 1999, and entitled "FILE PORTABILITY TECHNIQUES" which is hereby incorporated by reference. This application is also related to (i) U.S. Application Ser. No. 09/298,327 filed Apr. 23, 1999 and entitled "FILE PORTABILITY TECHNIQUES" which is hereby incorporated by reference, and (ii) U.S. Application Ser. No. 09/298,637 filed Apr. 23, 1999 and entitled "AUTOMATIC ADAPTER/STUB GENERATOR" which is hereby incorporated by reference.

BACKGROUND OF THE INVENTION

1. Field of Invention

The invention relates generally to computer systems. More particularly, methods and apparatus for selecting executable instructions in a multi-platform computing environment are disclosed.

2. Description of Relevant Art

The continuing proliferation of software platforms and hardware architectures ensures that both computer users and computer program developers will encounter many different computing environments in the course of their careers. It should be noted that in the context of this discussion, the term environment refers to the complete range of elements in a computing system that interact with the ported software. These elements typically include a processor and operating system as well as I/O devices, libraries, networks, or, in some cases, a larger human or physical system. Even though a few quasi-standard platforms (e.g. IBM-PC, UNIX) have become widely used there, as yet, is no universal computing environment. In order to maintain and expand their viability, therefore, most software programs will eventually face the need to be ported, such that an executable version of the software program based on the existing version is created in the new computing environment. Portability, or the ability of a software program to be ported to a given environment (i.e., the target) is, therefore, becoming universally recognized as a desirable attribute for most software programs. It is clear, therefore, that portability between different computing platforms enhances the value of a software program both by extending its usefull lifecycle and by expanding the range of installations in which it can be readily used. As is well known in the art, a software program can include an application program, a system program, or a component of a program whereas a software system is a collection of software programs.

A software program is portable if and to the degree that the cost of porting is less than the cost of rewriting the program in the new target environment. A software program would be perfectly portable if it could be ported at zero cost and, of course, this is never possible in practice. In practice there are two basic portability protocols, the first being binary portability (i.e., porting the executable form of the software program) and the second being source portability (i.e., porting the source language representation of the software program). Although binary portability protocols typically offer several advantages (related primarily to ease of porting) it can only be used to port software programs across strongly similar environments thereby severely limiting its usefulness in contrast, since source portability protocols assume availability of a source code, they typically provide a greater ability to adapt a particular software program to a wider range of computing environments.

Unfortunately, most of the porting process is still done by ad hoc methods that result in inefficient techniques that add substantially to the costs of porting software from one platform to another. By way of example, a compiler translates a computer program from one language into another, catching any errors in syntax along the way. Most commonly, a compiler translates some high level language, such as C++ or COBOL, into machine language such that the computer can understand without any translation. In order to fully port a compiler, therefore, several tasks must be accomplished in order for the ported compiler to be able to successfully, and in a highly reliable manner, perform its designed functions while operating in a totally different platform than the one it was originally conceived.

The several tasks required to be accomplished in order to fully port a compiler include proper instruction selection since generally many different instruction types can match the same machine independent semantics. A simple example is the operation defined as adding a constant of "1" to a value where the value of "1" can be represented as either an 8 bit or a 32 bit precision integer number. In another example, for an X86 processor found in the Pentium® and Pentium II® line of microprocessors, the floating point unit (FPU) has 3 precision modes in which it can perform various operations, such as addition and subtraction. In the case where the semantics require rounding to, for example 24 bit precision, and an FPU control word has set the FPU precision to be, for example 53 bits, it would be inefficient and incorrect for the X86 compiler to select instructions defined in the architecture description that produce 53 bits of precision without introducing additional rounding.

Other examples include multiple hardware platforms, such as the SPARC microprocessor configured as a V8 or a V9 processor. When configured as a V8 system, only V8 type instructions can be executed, however, when configured as the V9 system, either V8 type or V9 type instructions can be executed. Therefore, it is essential that in those cases where the V8 system is operating that only V8 type instructions be selected since V9 instructions can not execute on the V8 system.

It is also desirable to select not only those instructions that will properly execute on a particular platform, but also select those instructions that improve the overall performance of the processor by reducing the "cost" of execution. By way of example, storing the results of a particular operation, such as a subtraction, in a memory location is generally more computer resource intensive (i.e., more costly) than storing the same result in a data register. Therefore, it would be more cost effective, where possible, to select the instruction whose cost is the least of all those instructions that could possibly be used. Using the example above, it would make sense from a cost effectiveness standpoint to select the instruction that stores its result in a register as opposed to those instructions that store their respective result in a location in memory.

Therefore, what is desired is the capability of defining a selection protocol whereby not only are the proper instructions selected to execute in a multi-platform computing environment, but the cost of executing these selected instructions is minimized.

SUMMARY OF THE INVENTION

Broadly speaking, the invention relates to an improved method, apparatus and computer system for building a compiler having an instruction selector in a multi-platform environment. The invention can be implemented in numerous ways, including as a method, a computer system, and an apparatus. Several embodiments of the invention are discussed below.

According to one aspect of the present invention, an apparatus for compiling a platform specific compiler having an embedded instruction selector is described. The apparatus includes a set of user defined platform dependent compiler architecture descriptors that describe corresponding architectural features of a particular hardware platform and instruction predicates used by the instruction selector. An architecture descriptor compiler converts the user defined platform dependent compiler architecture descriptors into the platform dependent compiler source code and instruction selector source which is converted into platform dependent object code and instruction selector object code by a host compiler. The compiler is formed from platform independent compiler object code and the platform dependent compiler object code in combination with the instruction selector object code.

As a method for building a platform specific compiler, a set of user defined platform dependent compiler architecture descriptors that describe corresponding architectural features of a particular hardware platform dependent compiler and instruction predicates are provided. The descriptors and instruction predicates are converted into platform dependent compiler source code and instruction selector source code by an architecture descriptor compiler. The platform dependent compiler source code and instruction selector source code is compiled into platform dependent object code and instruction selector object code. The platform specific compiler having the embedded instruction selector is formed from the platform dependent object code, the instruction selector object code, and platform independent compiler object code.

In another embodiment, a platform specific compiler is disclosed. The compiler includes platform dependent compiler object code having embedded instruction selector object code and platform independent compiler object code which are suitable for execution on a particular hardware platform. An interface that is partially embedded in the platform independent code and partially embedded in the platform dependent object code mediates flow of information between the platform independent compiler code and the platform dependent compiler code during platform specific compiler run time.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which:

FIG. 6A illustrates an exemplary AD file organization in accordance with an embodiment of the invention;

DETAILED DESCRIPTION OF THE EMBODIMENTS

In the following description, frameworks and methods of selecting instructions in a multi-platform computing environment are described. The invention will initially be described in terms of a multi-platform compiler residing in a Java virtual machine. In general, in order to build a platform specific compiler having an embedded instruction selection code, a set of user defined platform specific architecture descriptors in the form of an architecture description language (ADL) file and a set of user defined instruction predicates are provided. It should be noted that the ADL can take many forms well known to those skilled in the art such as C++, Attribute Grammars, Custom Description Languages, etc., or some combination of these forms. In the described embodiment, the instruction predicates take the form of boolean expressions that in conjunction with instruction selection code embedded in the platform specific compiler, enable only those instructions that are to be executed. In one embodiment of the invention, the determination of the boolean expression's value may only be possible during instruction selection.

The AD file includes the user defined instruction predicates that form an input to a multi-platform compiler builder that includes an architecture design language compiler (ADLC). In one embodiment, the ADLC is used to generate particular target platform dependent compiler source code used to build the target specific compiler. The ADLC also generates target platform instruction selection source code and target platform instruction predicate source code. The platform specific compiler having an embedded instruction selector is built using the platform dependent compiler source code, the instruction selection source code, and the instruction predicate source code provided by the ADLC in combination with the platform independent compiler object code otherwise provided.

In this way, the platform specific compiler selects not only those instructions deemed by the user to be suitable for execution on the target platform but those instructions which improve processor performance by reducing instruction execution costs. In this way, the reliability and performance of the processor in a multi-platform environment are substantially improved.

Figure 1:
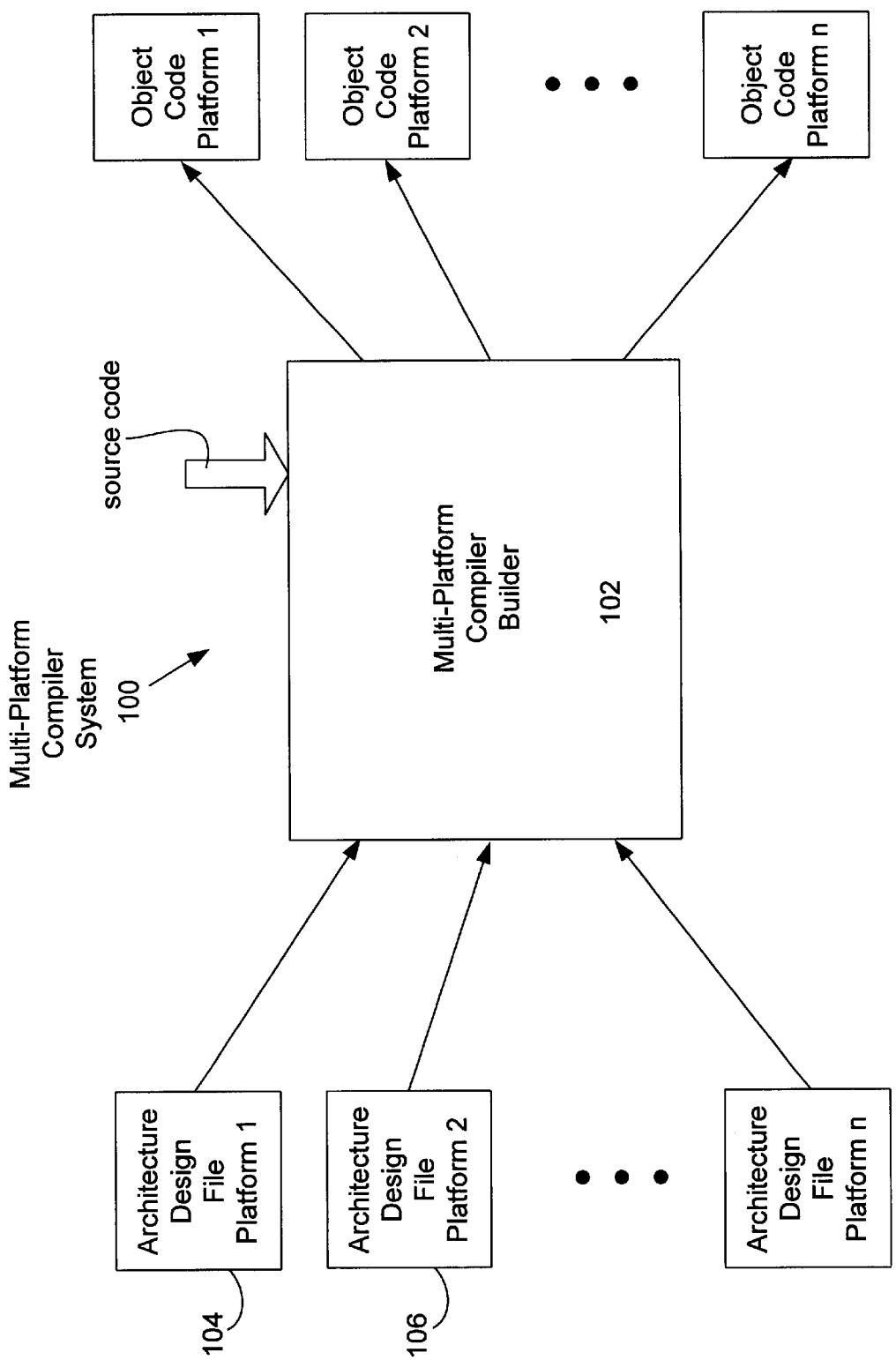
FIG. 1 is a representative block diagram of a multi-platform compiler system in accordance with an embodiment of the invention.

FIG. 1 is a representative block diagram of a multi-platform compiler system 100 in accordance with an embodiment of the invention. The multi-platform compiler system 100 is capable of building, or compiling, a platform specific compiler capable of selecting instructions appropriate to the target platform. In addition, the compiler is also capable of selecting those instructions that improve overall processor performance by reducing instruction execution cost.

In the described embodiment, the platform specific compiler is built by compiling platform independent source code representing those portions of the platform specific compiler that are independent of any particular platform and platform dependent source code representing those features of the compiler that are platform specific. In those cases where user defined (explicit) instruction predicates are provided, or where it is determined that particular instructions require instruction predicates regardless whether or not they are user supplied (implicit), the compiler is built using instruction predicate source code that provides the platform specific compiler with the aforementioned selection capability.

More particularly, in the described embodiment, the multi-platform compiler system 100 includes a compiler builder 102 arranged to build the platform dependent compiler using platform specific architecture descriptors and instruction predicates. In the described embodiment, the platform specific architecture descriptors take the form of architecture description language (ADL) used to represent those platform dependent portions of the target platform compiler while the instructions predicates take the form of boolean expressions. It should be noted that the ADL can take many forms well known to those skilled in the art such as C++, Java source code, Pascal, etc. Typically, it is the AD file that is coded by the user of the multi-platform compiler system 100, however, in some cases, the AD file is provided by original equipment manufacturers in situations referred to as "turn key" systems. In these situations, the end user has selected which target platforms are deemed to be useful and the supplier has provided the necessary coding efforts.

In many instances, the AD file is located in, for example, memory systems external to the compiler builder 102 such as an AD file 104 and an AD file 106. It should be noted that although any number of AD files can be provided, each specific to a particular platform, however, only one AD file at a time is processed by the compiler builder 102. In this way, when platform dependent source code specific to, for example, a platform type 1 is provided, the customized compiler builder 102 is capable of compiling source code into platform type 1 object code. For example, the AD file 104 can include ADL code having instruction predicates used by the compiler builder 102 to build an X86 compiler capable of preferentially selecting those instructions enabled by the user defined instruction predicates. As well known in the art, X86 object code are those instructions executable by an X86 microprocessor manufactured by the Intel Corporation of Santa Clara, Calif.

Along the same lines, the AD file 106 can include ADL code having instruction predicates used by the compiler builder 102 to build, for example, a SPARC compiler capable of preferentially selecting those instructions enabled by the user defined instruction predicates.

In both cases, the overall performance of the processor can be improved since a cost analysis is also performed substantially simultaneously with the selection. In this way, the compiler builder 102 is capable of automatically providing as many of the platform specific compilers having appropriate instruction selection code as there are AD files and corresponding user defined instruction predicates as are available.

Figure 2:
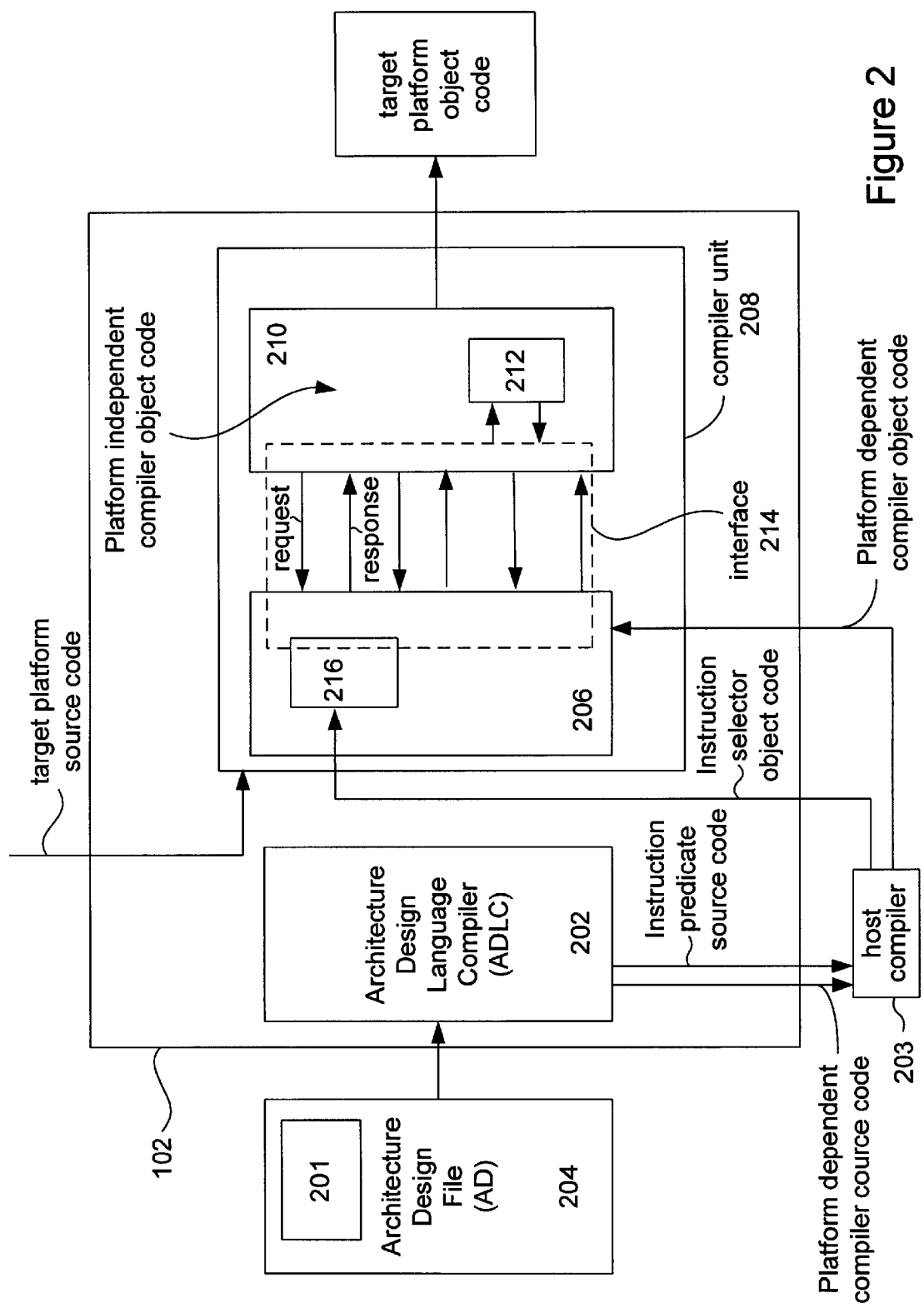
FIG. 2 illustrates a particular implementation of the multi-platform compiler shown in FIG. 1.

Referring now to FIG. 2 illustrating a particular implementation of the multi platform compiler builder 102 shown in FIG. 1. In the embodiment shown, the compiler builder 102 includes an architecture description language compiler 202 (ADLC) coupled to an AD file 204 having user defined instruction predicates file 201. The ADLC 202 is arranged to compile the platform specific ADL code included in the AD file 204 and the instruction predicates included in the file 201 to platform dependent compiler source code, instruction selector source code, and instruction predicate source code, respectively. In addition, the ADLC 202 is capable of generating instruction predicates that are not explicitly written in the AD file 204 in order to ensure a correct or efficient instruction selection, heretofore referred to as implicit instruction predicates.

The platform dependent compiler source code, the instruction selector source code, and the instruction predicate source code are, in turn, provided to a host compiler 203 coupled to the ADLC 202. In the described embodiment, the host compiler 203 is a C++ compiler well known to those skilled in the art. However, any compiler suitably arranged to compile source code to target specific compiler object code can be used.

During compile time, the host compiler 203 coupled to the ADLC 202 compiles the platform dependent source code in combination with the platform dependent instruction predicates source code and instruction selector source code to form the platform dependent compiler object code having embedded instruction selector object code. In the described embodiment, the platform dependent compiler object code is represented by a code block 206 that includes the embedded instruction selector object code represented by a code block 216 included in a compiler unit 208 coupled to the host compiler 203. The embedded instruction selector object code provides the customized compiler unit 208 with the capability of selecting those instructions deemed appropriate by the user. In addition, by performing a cost analysis, those instructions which reduce instruction execution cost are preferentially selected thereby improving processor performance by reducing overall instruction execution cost.

In some cases, the platform independent compiler object code is derived from platform independent compiler source code compiled by the host compiler 203. In other cases, such as the described embodiment, the platform independent compiler object code is already provided. In the described embodiment, the platform independent object code is represented by a code block 210 that includes, in one embodiment, a compilation engine 212 coupled to a platform independent interface 214. In a particular implementation, during what is referred to as run-time, the interface 214 mediates the transfer of information between selected portions of the platform dependent object code and instruction selection object code to the compilation engine 212.

By way of example, when an X86 microprocessor is required, the user provides, for this example, the AD file 204 having stored therein the appropriate ADL code specific to the X86 platform and the file 201 having the appropriate instruction predicates. As directed by the compiler builder 102, both the X86 specific ADL code and the instruction predicates are supplied to the ADLC 202. The ADLC 202 then compiles the ADL code X86 specific compiler source code and the instruction predicates to corresponding platform specific instruction predicates source code and instruction selector source code. It should be noted that the ADLC 202 is a universal compiler capable of converting any properly constructed AD file into corresponding platform specific compiler source code and, if required, platform dependent instruction predicate source code. In this way, any requirements that the user code, or in any way modify the ADLC 202 or any portion thereof are substantially eliminated. Therefore, the only coding required of the user is that required to provide a properly constructed and verified AD file that can include, if necessary, instruction predicates.

Once the ADLC 202 has compiled the X86 specific ADL code to X86 compiler source code and the instruction predicates into instruction selector source code, they are compiled to object code using host compiler 203 and represented by the blocks 206 and 216, respectively.

Figure 3:
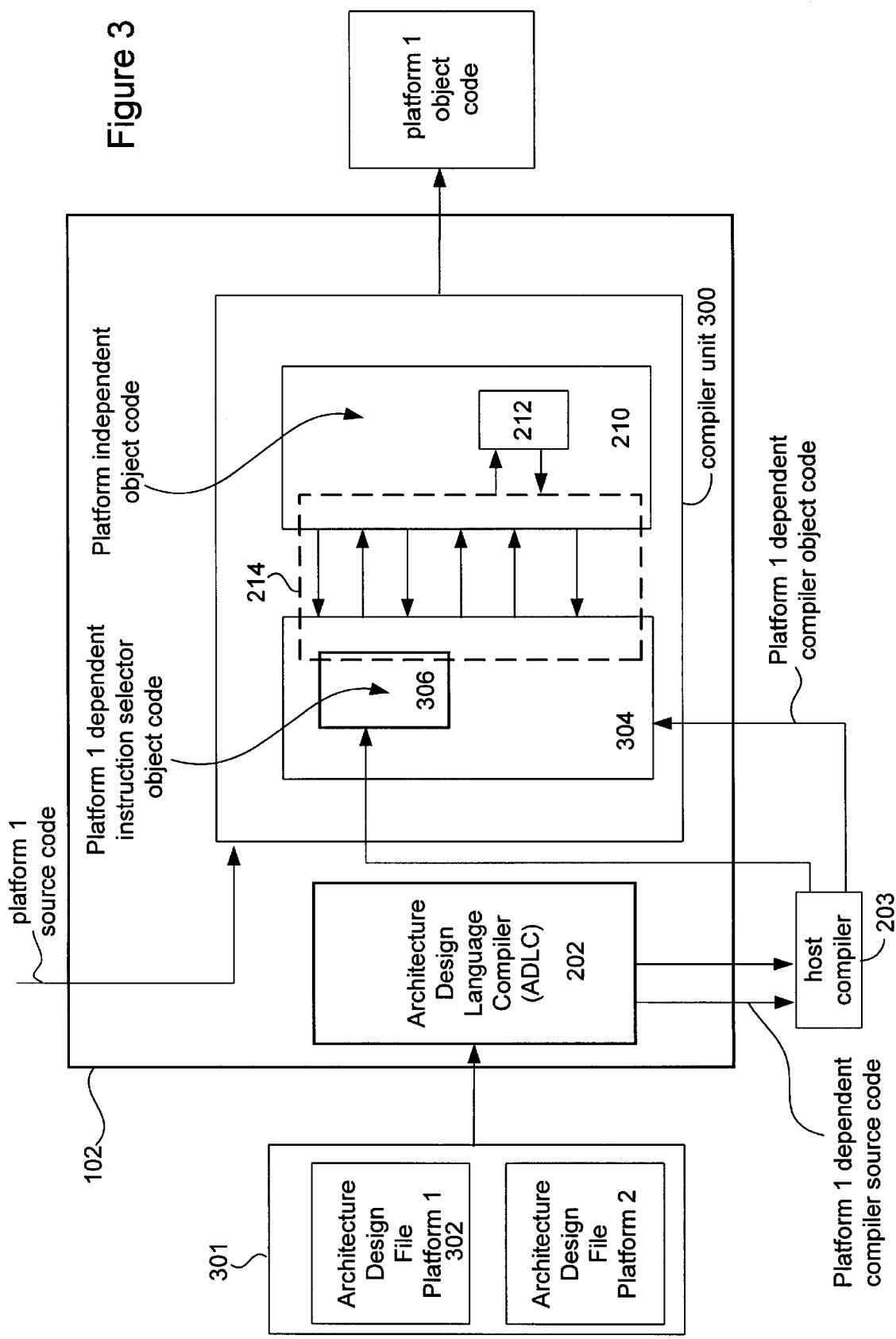
FIG. 3 shows another implementation of the compiler shown in FIG. 2.

In some cases, multiple platform dependent compiler source code files are made available to a compiler unit 300 shown in FIG. 3. The compiler unit 300 is one implementation of the compiler unit 208 shown in FIG. 2 and, as such, should only be consider exemplary in nature. In the described embodiment, the various platform dependent AD files are stored in a file stack 301. The file stack 301 can be local to the compiler unit 300 or, in some cases, can be remotely located in, for example, data bases, remote servers, etc. This arrangement is particularly well suited for applications involving transferring data over coupled computer networks, such as the Internet, local area networks (LANs), and the like. This use of multiple AD files is particularly advantageous since it provides the compiler unit 300 with the capability of operating, as needed, as any platform specific compiler represented by the corresponding AD file. By way of example, the file stack 301 includes platform an AD file 302 representing for example, SPARC specific description along with their corresponding instruction predicates which is converted to corresponding platform dependent source code 304 and instruction selector 306. With this arrangement, any platform having its corresponding AD file included in the file stack 301 could be selected to customize the compiler unit 300. Although not shown, a selector is typically employed to select which AD file is to be input to the ADLC 202.

Figure 4:
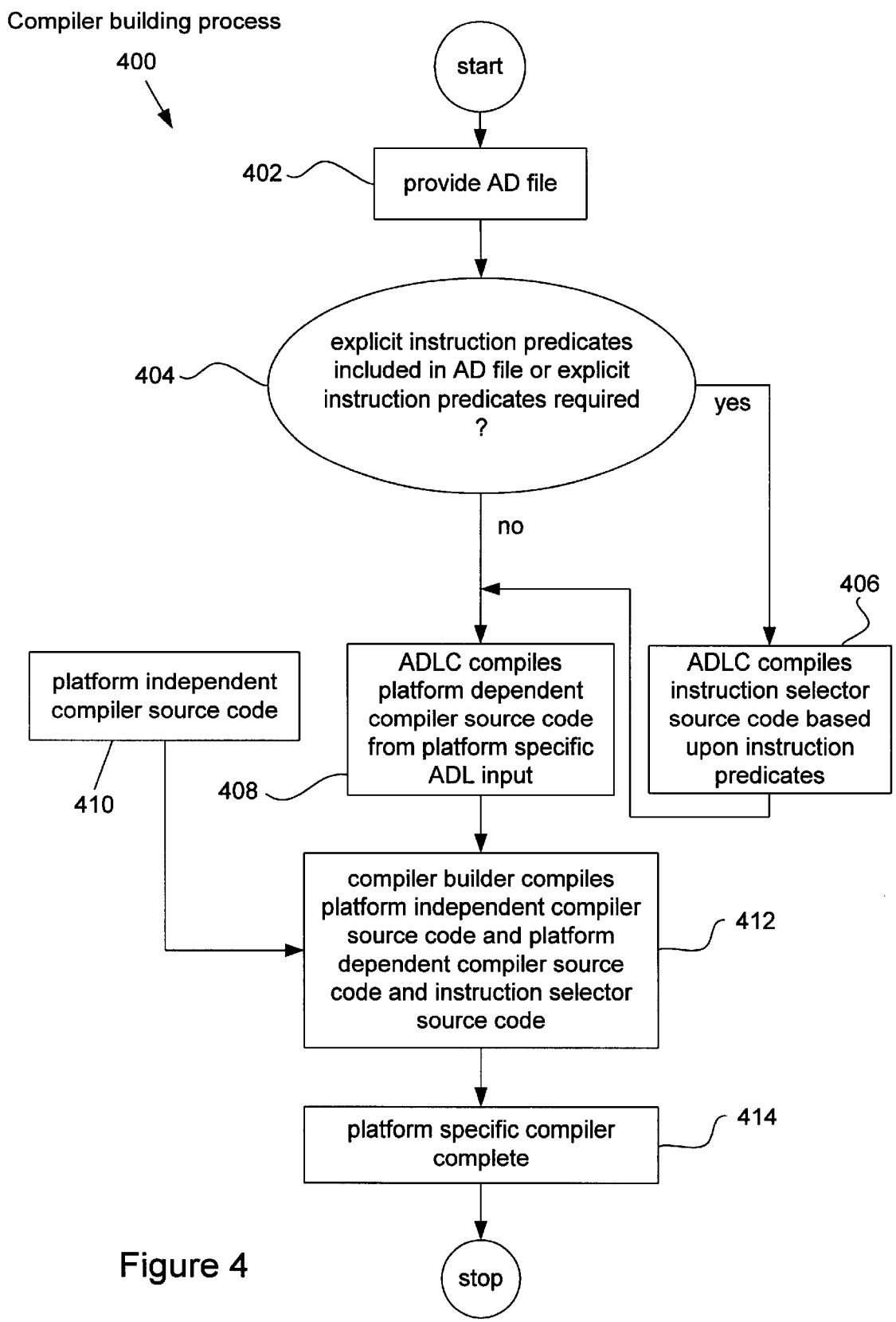
FIG. 4 shows a flowchart detailing a compiler building process in accordance with an embodiment of the invention.

As discussed above, the compiler builder 102 builds a particular compiler having an instruction selector, using in one embodiment, a process 400 detailed by the flowchart shown in FIG. 4. The process 400 begins at 402 by providing platform specific architecture descriptors in the form of ADL code stored in, for example, an AD file. At 404 a determination is made whether or not the AD file includes user defined instruction predicates (explicit) or whether or not implicit instruction predicates are required. Implicit instruction predicates are required when, for example, it is essential for proper instruction execution that particular data be present in particular locations. Such a situation occurs with those instructions having multiple occurrences of a particular operand where it is essential that each operand must be the same otherwise a processing error is likely to occur. Since the risks of error is likely to vary from platform to platform (i.e., executing a 3 address instruction on a 2 address platform versus executing a 2 address instruction on a 3 address platform), relying on the user to comprehend this fact is risky. In addition, an instruction predicate can require the use of implementation details of the compiler unit that may not be available to the writer of the AD file. Therefore, implicit instruction predicates are a part of the instruction selection process in that those particular instructions requiring special consideration are provided with the appropriate instruction predicate by the ADLC.

When explicit and/or implicit instruction predicates are required, the ADLC provides the instruction selector source code at 406. Substantially simultaneously with 406, the ADLC provides platform specific compiler source code at 408 based upon the AD file inputs, whereas, platform independent compiler source code is provided at 410. The host compiler then builds the platform specific compiler having instruction selection and execution cost analysis capability by compiling the platform independent source code, the platform dependent compiler source code, and the instruction predicates source code concurrently at 412.

Once the platform specific compiler has been built at 414, the platform specific compiler is available during run-time for selecting those cost effective instructions that are compiled into platform specific object code as needed. In a particular embodiment, during run-time, the platform independent interface mediates the flow of information between the compilation engine and the platform dependent compiler source code and instruction predicate source code.

More recently, the Java programming language, an object-oriented language, has introduced the possibility of compiling output (called bytecode) that can run on any computer system platform for which a Java virtual machine (or bytecode interpreter) is provided. The Java virtual machine is designed to convert the bytecode into instructions that can be executed by the actual hardware processor. Using this virtual machine, rather than being interpreted one instruction at a time, bytecode can be recompiled at each particular system platform by, in some cases, a just-in-time (JIT) compiler.

Figure 5:
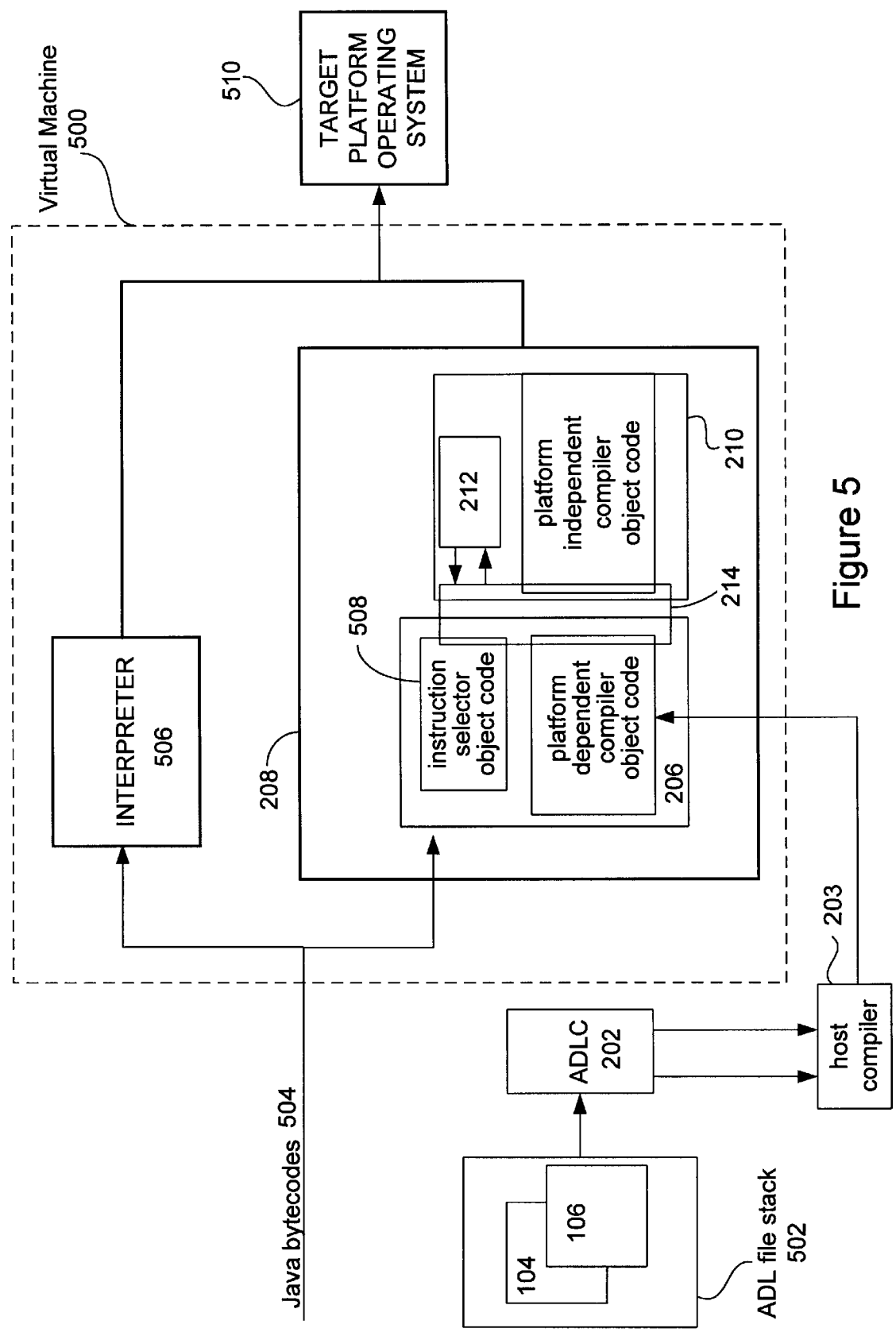
FIG. 5 illustrates a Java Virtual Machine (JVM) having a platform specific compiler in accordance with an embodiment of the invention.

FIG. 5 illustrates an apparatus that includes a Java Virtual Machine (JVM) 500 incorporating the compiler unit 208 in accordance with an embodiment of the invention. In the described arrangement, a platform specific AD file stack 502 coupled to the ADLC 202 includes a group of AD files each representing particular platform dependent compiler features. In the described embodiment, the AD file stack 502 includes the AD file 104 and AD file 106 representing the X86 and SPARC architectures, respectively. In the case where a number of different AD files are included in the AD file stack 502, a selector unit (not shown) is typically used to select a particular AD file from the AD file stack 502 corresponding to the desired operating platform. When the appropriate AD file is selected, the ADLC 202 converts the ADL code included in the selected AD file into appropriate platform dependent compiler source code as discussed above.

In the Java programming language and environment, a just-in-time (JIT) compiler is a program that turns Java bytecode into instructions that can be sent directly to the processor. After a Java program has been written, the Java source language statements are compiled by the Java compiler into Java bytecode rather than into code that contains instructions that match a particular hardware platform's processor (for example, an Intel Pentium microprocessor or an IBM System/390 processor). The Java bytecode is platform-independent code that can be sent to any platform and run on that platform.

More particularly, when bytecodes are provided to a JIT compiler provided by the compiler unit 208, the compilation of methods contained in bytecodes 504 is delayed until the methods are about to be executed. When bytecodes 504 are provided to an interpreter 506, bytecodes 504 are read into interpreter 506 one bytecode at a time. Interpreter 506 then performs the operation defined by each bytecode as each bytecode is read into interpreter 506. That is, interpreter 506 "interprets" bytecodes 504, as will be appreciated by those skilled in the art. In general, interpreter 506 processes bytecodes 504 and performs operations associated with bytecodes 504 substantially continuously.

When a method is compiled, the compiler unit 208 generates machine instructions as selected by an instruction selector 508. The compiler unit 208 then generates machine instructions from the selected bytecodes 504, and the resulting machine language instructions may be executed directly by the target platform operating system 510. In general, the machine-language instructions are discarded when virtual machine 500 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Referring now to FIG. 6 illustrating the organization of an AD file 600 in accordance with an embodiment of the invention. It should be noted that the organization shown is one of the many possible organizations that AD file 104 can take. In the described embodiment, the AD file 600 is a hierarchically organized set of distinct platform architecture descriptor data fields. By way of example, a register definition data field 602 is used by the ADLC to describe individual registers and classes of registers with the target architecture. An encoding block data field 604 specifies the encoding classes used by the target compiler to output byte streams. A frame management block data field 606 includes information that defines the frame structure and management protocols. Such information defines, for example, what direction the frame stack grows, the number of stack slots consumed by a monitor enter operation, stack alignment requirements, number of stack slots reserved for "Top of Stack", amongst others.

An operand data field 608 provides operand definition that must precede instruction definitions for correct compilation in the ADLC since operands constitute user defined types which are used in instruction definitions. A pipeline rules data field 610 is provided to define the behavior of the target architecture pipeline. An instruction definitions data field 612 provides instruction formats for the target architecture as well as corresponding instruction predicates. A peephole data field 614 provides target architecture specific optimization rules used by the ADLC.

Figure 6B:
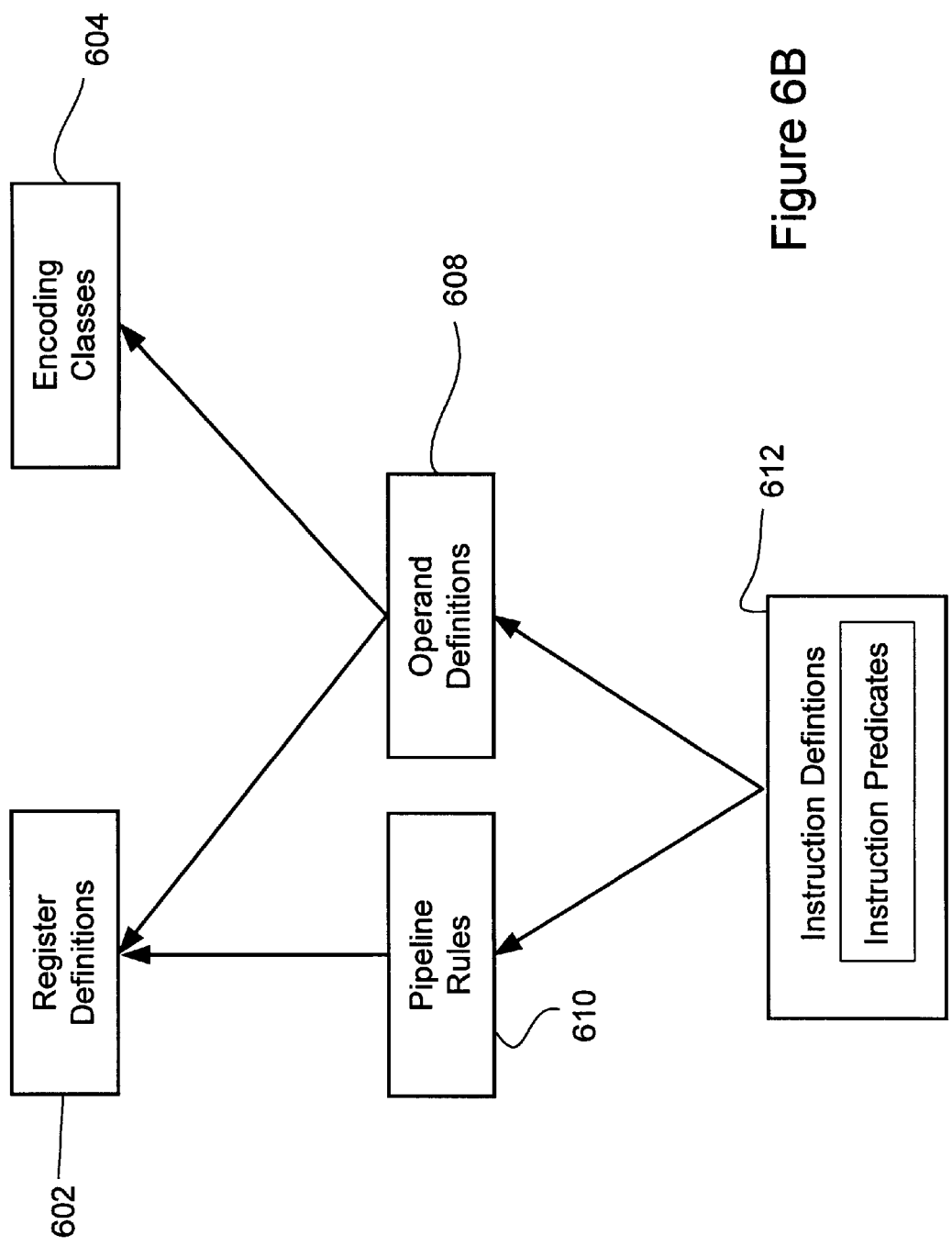
FIG. 6B illustrates a particular relationship between various data fields included in the AD file shown in FIG. 6A.

The hierarchical organization of the AD file 600 underlies the interrelationship amongst the various AD input data fields. FIG. 6B graphically illustrates one such relationship, specifically, the relationship between the various operands included in the instruction definitions data field 612. By performing an backwards traversal from using the instruction definitions data field 612 as the root, the relational dependencies for the various operands required to be input to the AD input data field is determinable. For example, by performing an upward traversal starting from the instruction definition data field 612 as the root and extending upward along the various branches, the pipeline rules data field 610 and operand definitions data field 608 are encountered. Performing an upward traversals from the from the pipeline rules data field 612 is the register definitions data field 602, while the register definitions data field 602 and the encoding class data field 608 are encountered when an upwards traversal from the operand definitions data field 608 is performed. In this way, the various operands required to fully define a particular instruction definition is provided.

Figure 7:
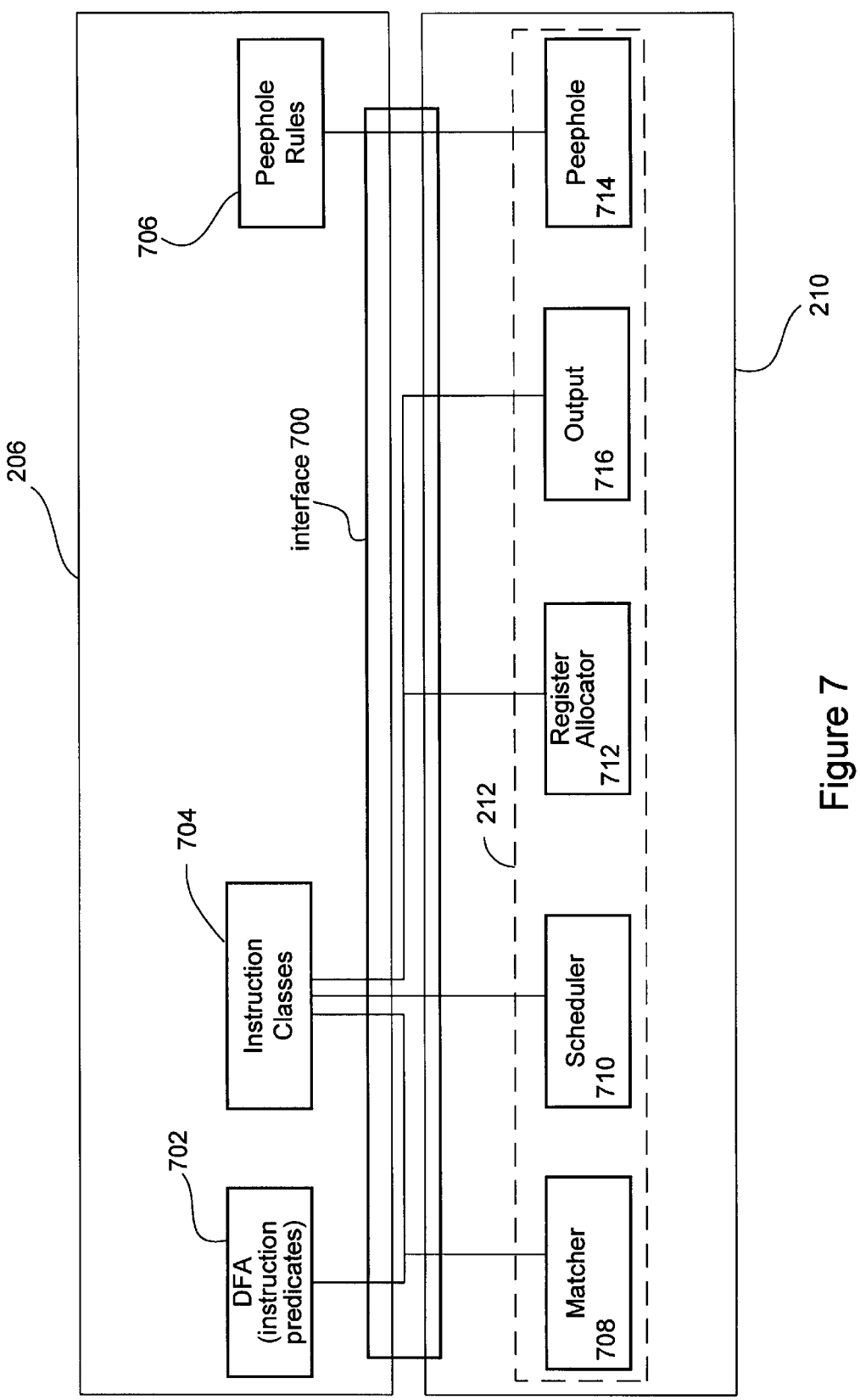
FIG. 7 illustrates an exemplary interface coupling platform dependent source code and platform independent source code in accordance with an embodiment of the invention.

FIG. 7 illustrates an exemplary interface 700 used by the platform dependent compiler in accordance with an embodiment of the invention. The interface 700 mediates communication between the compiler engine 212 (or the platform independent object code and the platform dependent object code in the block 206. In the embodiment shown, the ADLC output includes object code for a deterministic finite automaton (DFA) 702 that specifies the mapping from ideal operations to machine instructions. The ADLC output also includes object code that defines a set of instruction classes 704 that are used to, for example, define legal register masks, encoding methods, branch offset behavior, etc. Object code for a peephole rules oracle706 that specifies machine specific trees that are legal to optimize and what the correct replacement is for those trees is also output by the ADLC. In this way, the platform specific architecture characteristics are automatically provided in a format suitable for the compilation engine 212 to use in compiling source code into platform dependent object code.

The target independent portion of the interface 700 is coupled to a matcher 708 which generates input trees to be processed by the DFA 702 that performs bottom up rewrite rule system (BURS) style tree pattern matching in order to select machine instructions for ideal operations in the intermediate representation.

The interface 700 also includes object code arrange to act as a peephole DFA that performs tree pattern matching to find optimization candidates and replaces matched trees of machine instructions with optimized trees of machine instructions. A matcher 708 performs instruction selection using the matcher DFA and builds machine specific intermediate representations. A scheduler 710 orders the machine specific intermediate representations while a register allocator 712 selects a legal assignment of registers to operands in the machine specific representation. This includes the insertion of any instructions necessary to relocate values to proper locations (such as moving arguments to their appropriate location specified by the calling convention). A peephole optimizer 714 pattern matches small trees in the machine specific representation and replaces them with more optimal machine specific trees. An object code output 716 uses virtual calls to encode machine specific representation as machine object code in a buffer and makes the buffer available to the virtual machine.

Figure 8:
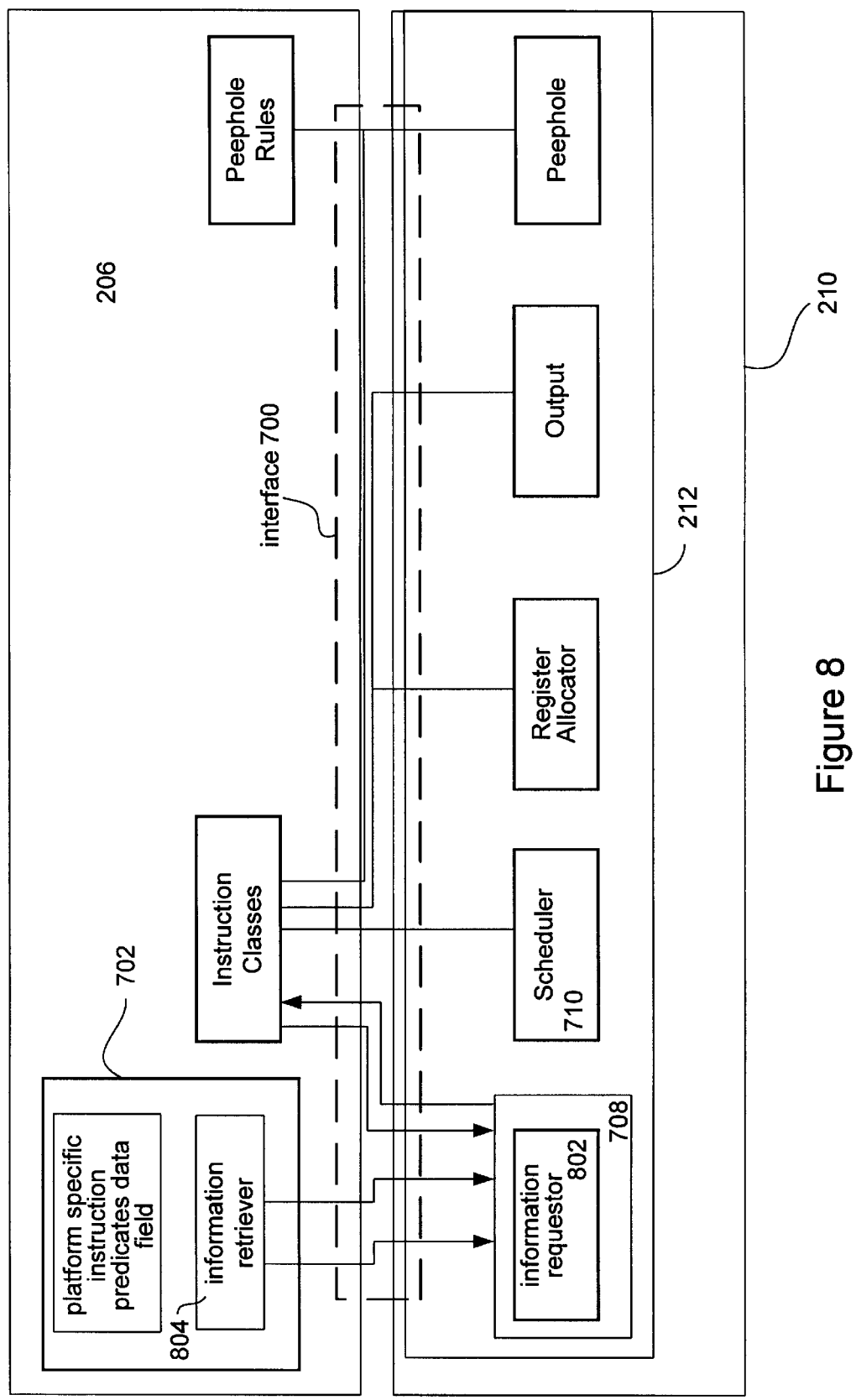
FIG. 8 is an exemplary representation of a run-time process by the compilation engine in accordance with an embodiment of the invention.

FIG. 8 is an exemplary representation of an instruction compilation process carried out during run-time by the compilation engine 212 in accordance with an embodiment of the invention. During the run-time, the compilation engine 212, when required, generates an information request (referred to, in a particular embodiment, as an emit function call) for specific information from the platform dependent compiler object code and, if necessary, the instruction selector object code. By way of example, when the compilation engine 212 requires platform specific information in order to select an instruction using the embedded instruction selector, the compilation engine 212 executes a function call to a information requestor 802. The information requestor 802, in turn, is coupled to the interface 700 which directs the function call to a information retriever 804 coupled to the DFA having the required instruction predicates. In the described embodiment, the DFA then selects the instruction based upon the corresponding instruction predicates. The information retriever 804, in turn, responds to the function call by retrieving the requested information. It should be noted that the retrieved information is structured in such a manner as to be readily used by the compilation engine 212.

Figure 9:
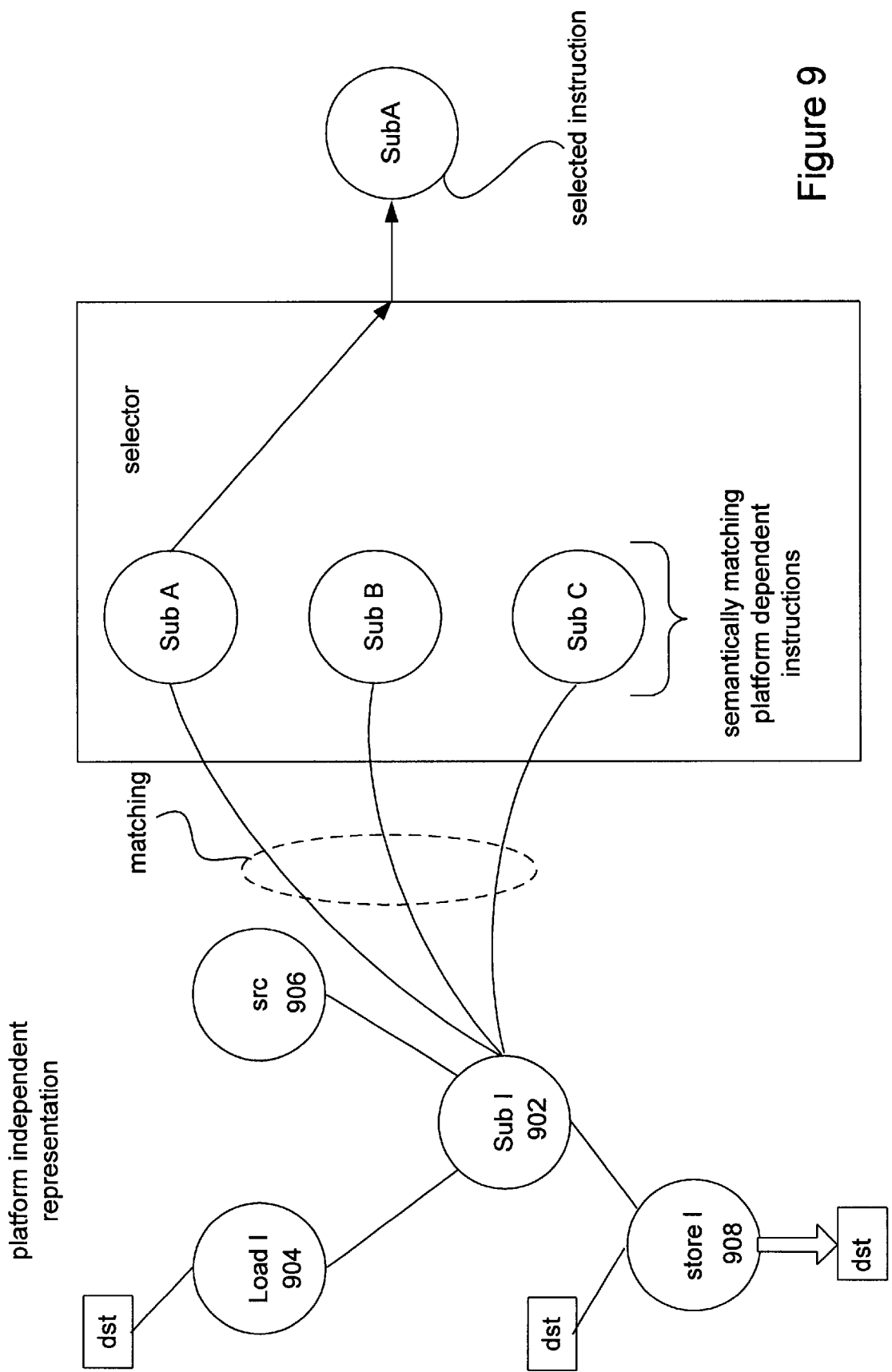
FIG. 9 is a representation of a machine independent instruction.

FIG. 9 represents an exemplary machine independent graph 900 of an instruction having multiple recurrences of an operand in accordance with an embodiment of the invention. The machine independent graph 900 is mapped to those machine dependent instructions having the same semantics. For example, the graph 900 node 902 represents at the most basic level a subtraction operation that would map to any number of machine dependent subtraction operation (subA, subB, subC) having the same semantics corresponding to subtraction. However, as discussed previously, not all of the possible mappings are desirable since some may in fact result in processing errors. This can occur, for example, in those situations where the target platform is a 2 address processor (such as an X86) and the result of the subtraction operation is required to be stored into a location distinct from that of the inputs (as can be done by 3 address instructions in the SPARC architecture). Typically, a bottom up matching process is used to break down the binary tree representation of the machine instruction into semantics that the target platform can understand and execute. In this example, each node of the tree is mapped to a target dependent instruction as selected by the instruction predicate using the instruction selection code generated by the ADLC.

The root instruction node 902 indicates that the instruction 900 is an integer subtraction operation having as inputs the results of node 904 and node 906. The result of the subtraction operation is stored in a register at 908. In this example, the instruction selector selects the most cost effective instruction or sequence of instructions out of all matching instructions to be executed.

Figure 10:
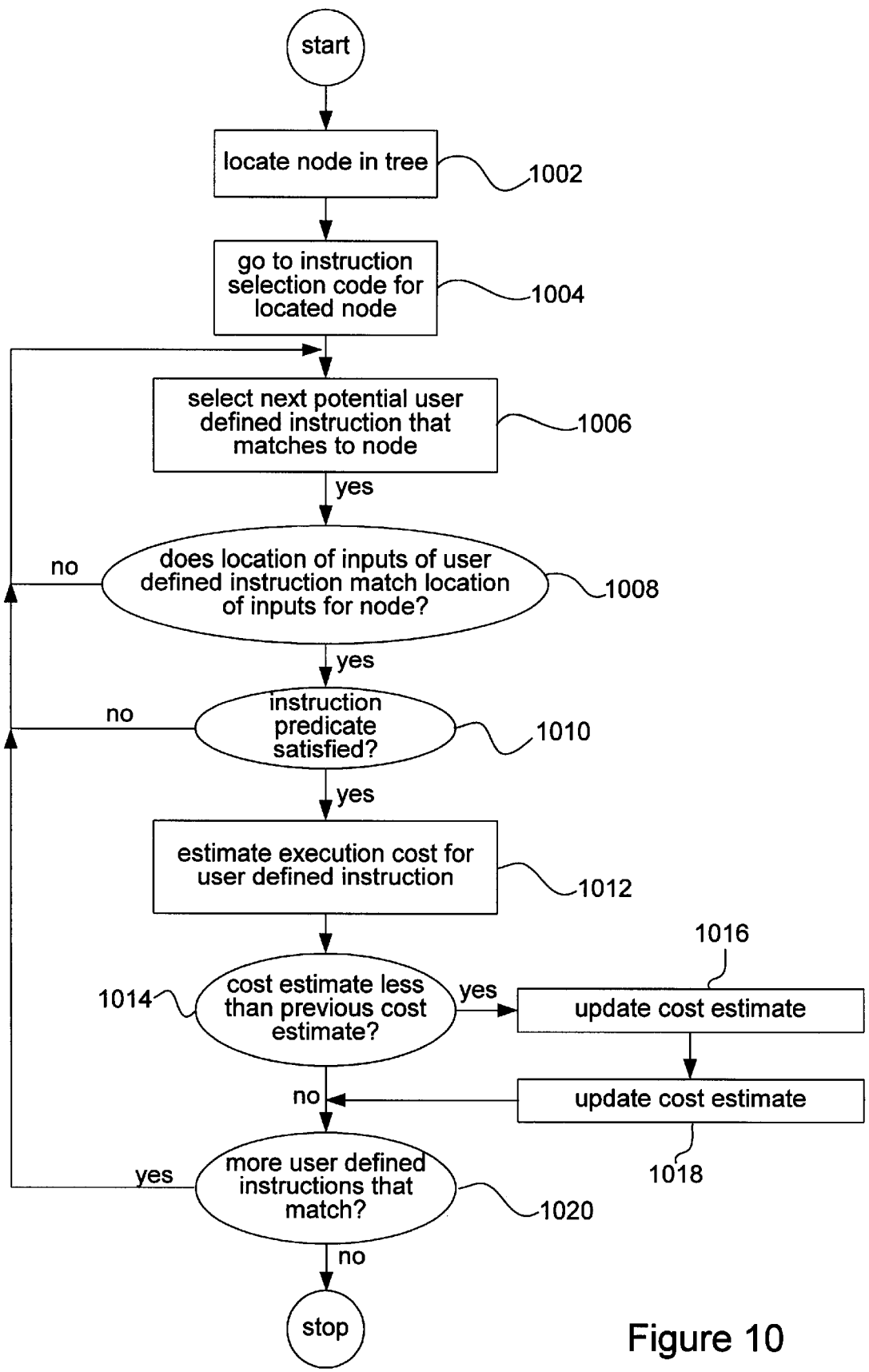
FIG. 10 is flowchart detailing the instruction selection process in accordance with an embodiment of the invention.

FIG. 10 is a flowchart detailing an instruction selection process 1000 in accordance with an embodiment of the invention. The process 1000 begins at 1002 by locating a node in the machine independent binary tree representation of the instruction. At 1004, the instruction selection code corresponding to the located node is obtained and executed. The next potential user defined instruction that can matches the located node is then checked at 1006. This matching is based upon matching comparing the semantics between the machine independent representation of the node and the target platform representation of the node. At 1008, a determination is made whether or not the location of inputs of the user defined instruction matches the location of inputs for the located node. If it is determined that there is match, then a determination is made at 1010 whether or not the instruction predicate is satisfied. If the instruction does not match or the instruction predicate is not satisfied, then control is passed back to 1006 where the next potential user defined instruction that matches the node is selected.

Returning back to 1010, if the instruction predicate is satisfied, then an estimate of the execution cost is made for the user defined instruction at 1012. A determination is made at 1014 whether or not the cost estimate is less than the previous cost estimate. If the cost estimate is less, then the cost estimate variable is updated at 1016 and the best instruction is updated at 1018 after which a determination at 1020 is made whether or not there are more user defined matching instructions. If there are no matching instructions then the process stops, however, if there are more matching instructions, then control is passed back to 1006.

Returning to 1014, if it is determined that the cost estimate is not less, then if there are additional matching instructions, control is passed back to 1006, otherwise the process stops.

Figure 11:
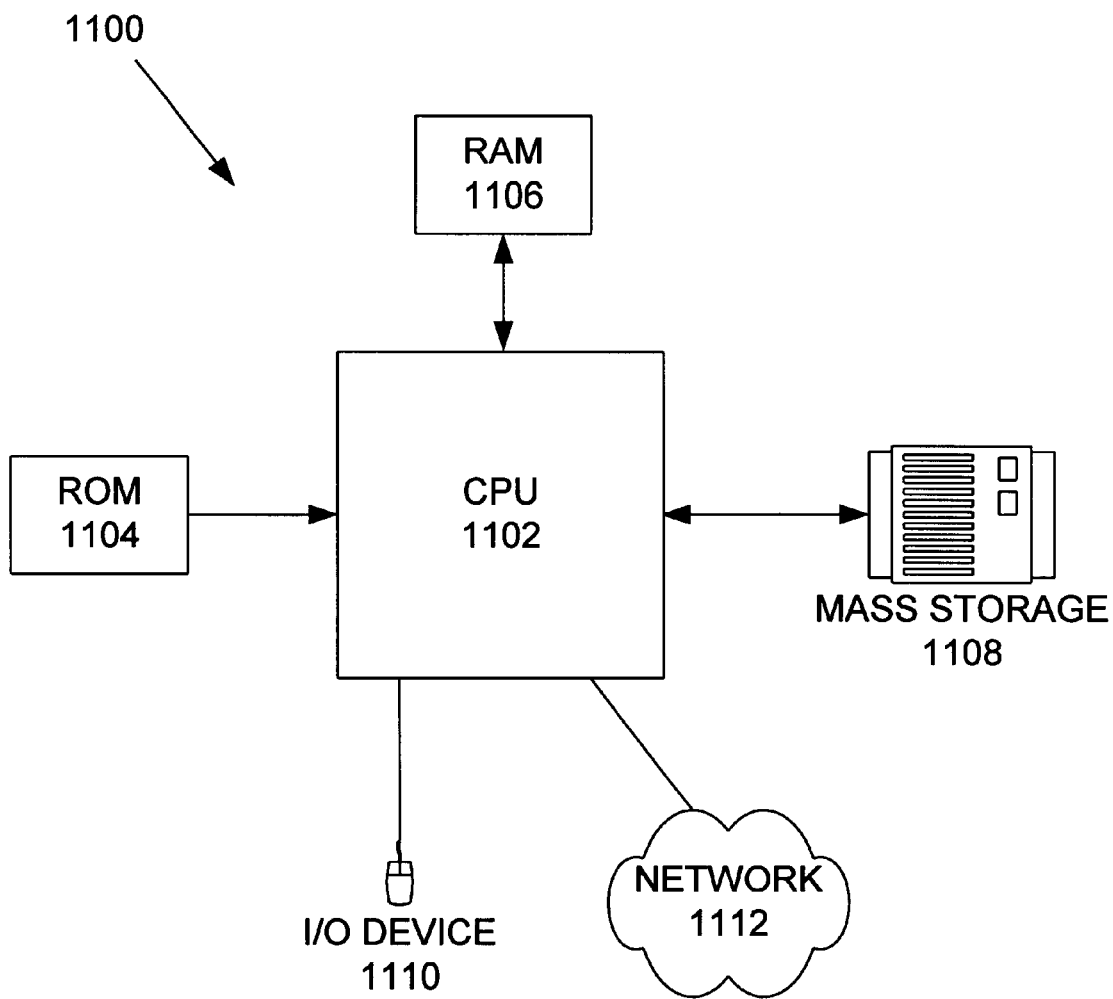
FIG. 11 illustrates computer system employed implement to the invention.

FIG. 11 illustrates a computer system 1100 employed to implement the invention. The computer system 1100 or, more specifically, CPUs 1102, may be arranged to support a virtual machine, as will be appreciated by those skilled in the art. As is well known in the art, ROM acts to transfer data and instructions uni-directionally to the CPUs 1102, while RAM is used typically to transfer data and instructions in a bi-directional manner. CPUs 1102 may generally include any number of processors. Both primary storage devices 1104, 1106 may include any suitable computer-readable media. A secondary storage medium 1108, which is typically a mass memory device, is also coupled bi-directionally to CPUs 1102 and provides additional data storage capacity. The mass memory device 1108 is a computer-readable medium that may be used to store programs including computer code, data, and the like. Typically, mass memory device 1108 is a storage medium such as a hard disk or a tape which generally slower than primary storage devices 1104, 1106. Mass memory storage device 1108 may take the form of a magnetic or paper tape reader or some other well-known device. It will be appreciated that the information retained within the mass memory device 1108, may, in appropriate cases, be incorporated in standard fashion as part of RAM 1106 as virtual memory. A specific primary storage device 1104 such as a CD-ROM may also pass data uni-directionally to the CPUs 1102.

CPUs 1102 are also coupled to one or more input/output devices 1110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1102 optionally may be coupled to a computer or telecommunications network, e.g. an Internet network or an intranet network, using a network connection as shown generally at 1112. With such a network connection, it is contemplated that the CPUs 1102 might receive information from the network, or might output information to the network in the course of performing the above-described method steps. Such information, which is often represented as a sequence of instructions to be executed using CPUs 1102, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the multi-platform compiler can be used in any computing system.

Although the methods of porting a compiler from one operating system to another, different operating system in accordance with the present invention are particularly suitable for implementation with respect to a JavaTm based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a distributed object based computer system, it should be appreciated that the present invention may generally be implemented on any suitable computing system having a compiler. Therefore, the present examples are to be considered as illustrative and not restrictive, and the invention is not to be limited to the details given herein, but may be modified within the scope of the appended claims along with their full scope of equivalents.

What is claimed is:

1. An apparatus for generating a platform specific compiler having an embedded instruction selector, comprising:

a set of user defined platform dependent compiler architecture descriptors that describe corresponding architectural features of a particular hardware platform dependent compiler;

a set of instruction predicates used to identify platform specific instructions selected by the instruction selector;

an architecture descriptor compiler arranged to convert the user defined platform dependent compiler architecture descriptors into the platform dependent compiler source code and arranged to convert the set of instruction predicates into platform specific instructor selector source code;

a host compiler arranged to compile the platform dependent compiler source code into platform dependent compiler object code and arranged to compile the platform specific instructor selector source code into the embedded instruction selector object code;

platform independent compiler object code; and an interface arranged to mediate the flow of information between the platform dependent compiler object code and the platform independent compiler object code during run time for the platform specific compiler, wherein during platform specific compiler run time, the embedded instruction selector selects the instruction to be compiled based upon the execution cost of the selected instruction, and wherein the embedded instruction selector provides implicit instruction predicates used by the platform specific compiler to compile the selected instruction.

2. An apparatus as recited in claim 1, wherein the platform specific compiler includes platform independent compiler object code and platform dependent compiler object code suitable for execution of the particular hardware platform.

3. An apparatus as recited in claim 2, wherein during platform specific compiler run time, the platform independent compiler object code requests specific platform dependent object code information by providing an information request to the interface which directs the information request to a pre-determined platform dependent compiler object code information retriever.

4. An apparatus as recited in claim 3, wherein the platform dependent compiler object code information retriever responds to the information request by retrieving specific platform dependent compiler object code information in satisfaction of the information request.

5. An apparatus as recited in claim 4, wherein the retrieved information is provided to the interface which, in turn, directs the information to the information requestor.

6. An apparatus as recited in claim 1, wherein said apparatus comprises a plurality of sets of user defined platform dependent architecture descriptors, wherein each of which corresponds to a different hardware platform.

7. A method of building a platform specific compiler having an embedded instruction selector, comprising:

providing a set of user defined platform dependent compiler architecture descriptors that describe corresponding architectural features of a particular hardware platform dependent compiler;

providing a set of user defined instruction predicates used by the embedded instruction selector to select those instructions to be compiled by the platform specific compiler during run time;

converting the set of user defined platform dependent compiler architecture descriptors into platform dependent compiler source code by an architecture descriptor compiler;

converting the set of user defined instruction predicates into platform instruction selector source code by an architecture descriptor compiler;

compiling the platform dependent compiler source code into platform dependent object code by a host compiler coupled to the architecture descriptor compiler;

compiling the instruction selector source code into instruction selector object code by a host compiler coupled to the architecture descriptor compiler;

during runtime, providing an information request to a platform independent interface arranged to mediate a transfer of information between selected portions of the platform dependent object code and the instruction selection object code;

directing the information request to a pre-determined platform dependent compiler object code information retriever by the interface;

providing platform independent compiler object code, wherein the platform independent compiler object code and the platform dependent compiler object code are suitable for execution on the particular hardware platform; and forming the embedded instruction selector from the platform dependent compiler object code, the instruction selector object code, and the platform independent compiler object code, wherein the embedded instruction selector selects an instruction to be compiled based upon an associated execution cost of the selected instruction, and wherein the embedded instruction selector provides an implicit instruction predicate used by the platform specific compiler to compile the selected instruction.

8. A method as recited in claim 7, further comprising:

requesting specific platform dependent object code information by the platform independent object code during platform specific compiler run time.

9. A method as recited in claim 8, further comprising:

retrieving specific platform dependent compiler object code information in satisfaction of the information request in response to the request by the information retriever.

10. A method as recited in claim 9, further comprising:

directing the retrieved information to the information requestor by the interface.

11. A method as recited in claim 10, further comprising:

directing the retrieved information to the information requestor by the interface.

12. A platform specific compiler having an embedded instruction selector, comprising:

a platform dependent compiler object code;

a platform independent compiler object code, wherein the platform independent compiler object code and the platform dependent compiler object code are suitable for execution on a particular hardware platform;

a platform dependent instruction selector object code embedded in the platform dependent compiler object code;

an interface partially embedded in the platform independent compiler object code and partially embedded in the platform dependent compiler object code, wherein during platform specific compiler run time, the interface mediates flow of information between the platform independent compiler object code and the platform dependent compiler code, wherein the embedded instruction selector selects an instruction to be compiled based upon an associated execution cost of the selected instruction, and wherein the embedded instruction selector provides an implicit instruction predicate used by the platform specific compiler to compile the selected instruction.

13. A compiler as recited in claim 12, wherein during platform specific compiler run time, the platform independent compiler object code requests specific platform dependent compiler object code information by providing an information request to the interface which directs the information request to a pre-determined platform dependent compiler object code information retriever.

14. An apparatus as cited in claim 13, wherein the platform dependent compiler object code information retriever responds to the information request by retrieving specific platform dependent compiler object code information in satisfaction of the information request.

15. An apparatus as recited in claim 14, wherein the retrieved information is provided to the interface which, in turn, directs the information to the information requestor.

16. An apparatus as recited in claim 12, wherein said apparatus comprises a plurality of sets of user defined platform dependent architecture descriptors, wherein each of which corresponds to a different hardware platform.

* * * * *

UNITED STATES PATENT AND TRADEMARK OFFICE
CERTIFICATE OF CORRECTION

PATENT NO. : 6,286,134 B1
DATED : September 4, 2001
INVENTOR(S) : Click, Jr. et al.

It is certified that error appears in the above-identified patent and that said Letters Patent is hereby corrected as shown below:

Column 1,
Line 45, change "usefull" to -- useful --
Line 64, change "usefulness in" to -- usefulness. In --

Column 4,
Line 16, after "illustrates" insert -- a --
Line 16, after "employed", insert -- to --
Line 17, after "implement", delete "to"

Column 5,
Line 25, change "instructions" to -- instruction --

Column 6,
Line 60, after "code", insert -- to --

Column 7,
Line 29, change "description" to -- descriptors --

Column 9,
Line 63, after "code", insert -- ) --

Column 15,
Line 11, change "cited" to -- recited --

Signed and Sealed this

Twelfth Day of November, 2002

*Attest:*

*Attesting Officer*

JAMES E. ROGAN
*Director of the United States Patent and Trademark Office*